June 17, 1947.  R. J. GOODEN  2,422,541
MILK PAIL
Filed Jan. 24, 1945
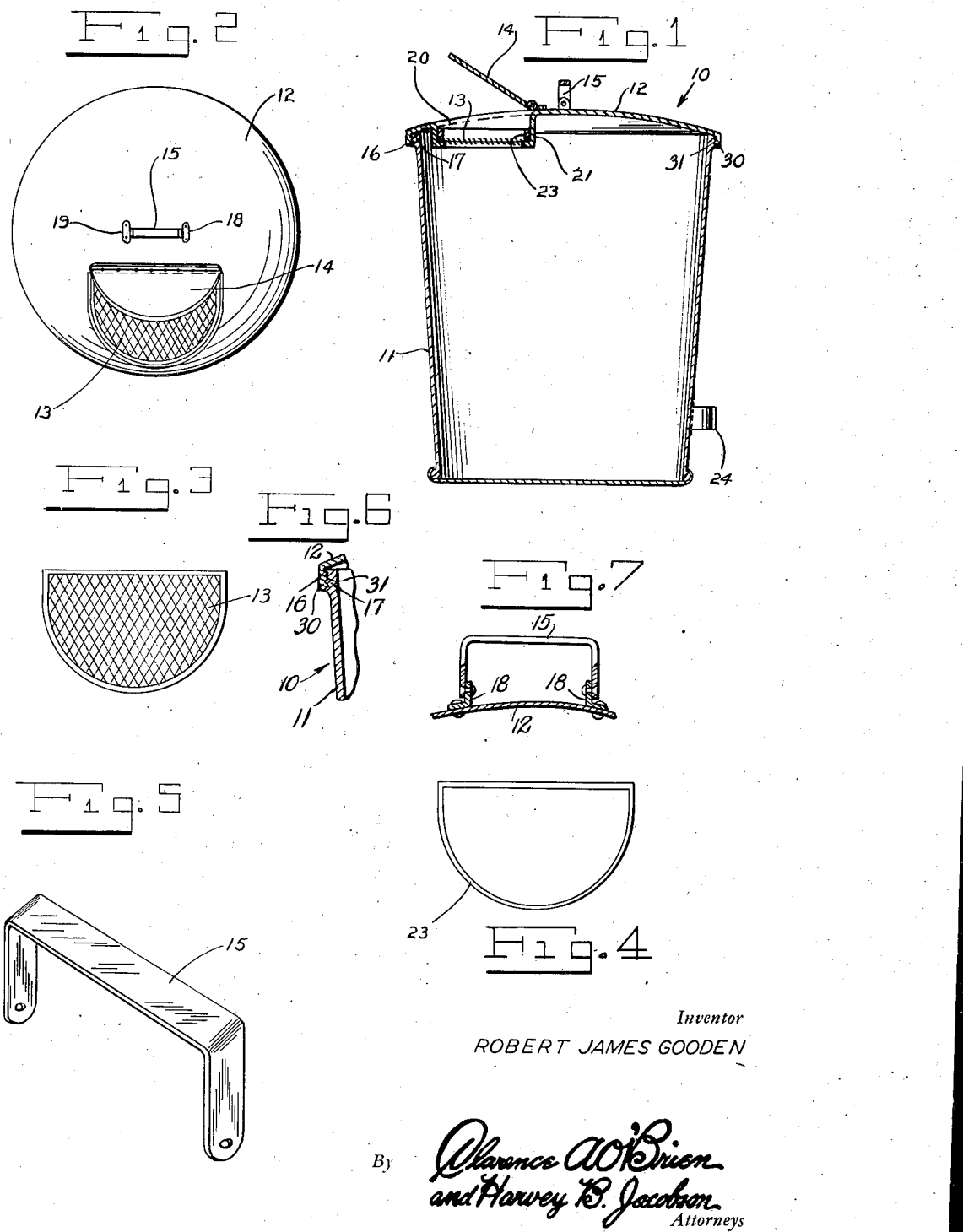
Inventor
ROBERT JAMES GOODEN
By Clarence A. O'Brien
and Harvey B. Jacobson
Attorneys Patented June 17, 1947

2,422,541

UNITED STATES PATENT OFFICE 2,422,541

MILK PAIL

Robert James Gooden, North Kansas City, Mo.

Application January 24, 1945, Serial No. 574,381

2 Claims. (Cl. 31—50)

This invention relates to dairy accessories and has for its object to provide a sanitary milk pail.

Another object of the invention is to provide a milk pail in which the milk is strained before entering the pail.

A further object of the invention is to provide in a milk pail top a removable strainer.

Another object of the invention is to provide a milk pail so constructed that it must be closed before it can be carried.

And a still further object of the invention is to provide a milk pail having a top from which any milk accidentally milked thereon cannot run into the pail or into a vessel into which the milk is being poured from the pail.

Other features and advantages will become more readily apparent from the following description and the accompanying illustrative drawings in which:

Figure 1 is a vertical sectional view of my improved milk pail,

Figure 2 is a top plan view thereof,

Figure 3 is a detail view of a strainer member,

Figure 4 is a detail of a strainer attaching hoop;

Figure 5 is a detail perspective view of a bail; and

Figure 6 is an enlarged sectional view taken through the flange and bead on the cover and pail respectively showing the threaded connections therebetween, and Figure 7 is an enlarged detail sectional view through the handle showing method of attachment.

In the accompanying drawings as above enumerated and in the following specification, like characters of reference indicate like parts throughout and in which 10, is generally a milk pail according to my invention and includes a pail 11, a top 12, a strainer 13, a lid 14, and a handle or bail 15.

The flange 16 of the top 12 and the bead 17 of the pail 10 are provided with the coarse interengaging threads 30 and 31, respectively, for detachably supporting the top 12 upon the pail 10. This top is slightly convex throughout for a double purpose, the principal one of which is that any milk or other splash falling accidentally thereon will immediately run off and not into the bucket or into a vessel into which the milk is to be poured from the bucket. The second purpose of the convexity is that the bail 15, which is pivoted by being secured to the studs 18 and 19, which must be turned down upon the top in order to open the lid 14, wide, may be quickly taken hold of after the lid has been closed. The principal purpose of making it necessary to lay the bail down horizontally before the lid 14, may be opened wide enough to milk into the pail is in order that the bucket can not be carried by the bail until after the lid has been closed, thus preventing dust from entering.

Projecting down from the under side of the pail top and surrounding the opening 20 in said top 12, is a substantially semicircular flange 21, formed with a horizontally extending flange about its lower end between which and the removable friction collar 23, the coarse mesh strainer cloth 13 is clamped. As seen in Figure 1, the collar 23 rests upon said horizontally extending flange. The member 13, is preferably a rather fine netting, which may readily be removed for cleansing and as quickly be replaced, although a wire cloth net may be used if desired.

Hingedly attached to the top 12, is the lid 14, which must be swung back upon the bail 15, in order to milk through the opening 20, into the pail and as above stated it must be closed before the pail can be carried. A handle 24, is provided near the bottom of the bucket, opposite to the opening 20, in order that it may easily be tilted to pour out the contents thereof.

In using the above described pail the milk is kept in a far more sanitary and healthy condition than when the top of the pail is wide open as is usual. Since the milk is milked directly to and through the strainer, there will be no splashing of the milk on the inside wall of the pail. The strainer will prevent any foreign matter from entering the pail. The milk will be strained again when the top is removed and the milk is poured from the pail through a second strainer (not shown). The strainer 13 may be removed for washing when the pail is washed.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

1. A milk pail, a convex top therefor having an opening therein, a strainer removably mounted in said opening, a bail hinged to said top, and a lid for the opening, said lid being hinged to the top and adapted, when in open position, to lie upon said bail when the latter is disposed in horizontal position on the lid.

2. A milk pail, a convex top therefor having an opening therein, a strainer removably mounted in said opening, a bail hinged to said top, and a lid for the opening, said lid being hinged to the top and adapted, when in open position, to lie upon said bail when the latter is disposed in horizontal position on the lid, a bead formed about the upper end of said pail and a downwardly directed locking flange about the periphery of said top for detachably locking the same in position on said pail.

ROBERT JAMES GOODEN.

REFERENCES CITED

The following references are of record in the file of this patent:

UNITED STATES PATENTS

| Number | Name | Date |
|---|---|---|
| 2,254,141 | Garcia | Aug. 26, 1941 |
| 1,062,650 | Hudson | May 27, 1913 |
| 2,215,607 | Eastwood | Sept. 24, 1940 |
| 966,039 | Mowry et al. | Aug. 2, 1910 |
| 1,080,551 | Hartwell | Dec. 9, 1913 |
| 1,119,725 | Ray | Dec. 1, 1914 |